J. E. NOEGGERATH.
COLLECTOR RING.
APPLICATION FILED NOV. 26, 1907.
919,626.
Patented Apr. 27, 1909.
2 SHEETS—SHEET 1.
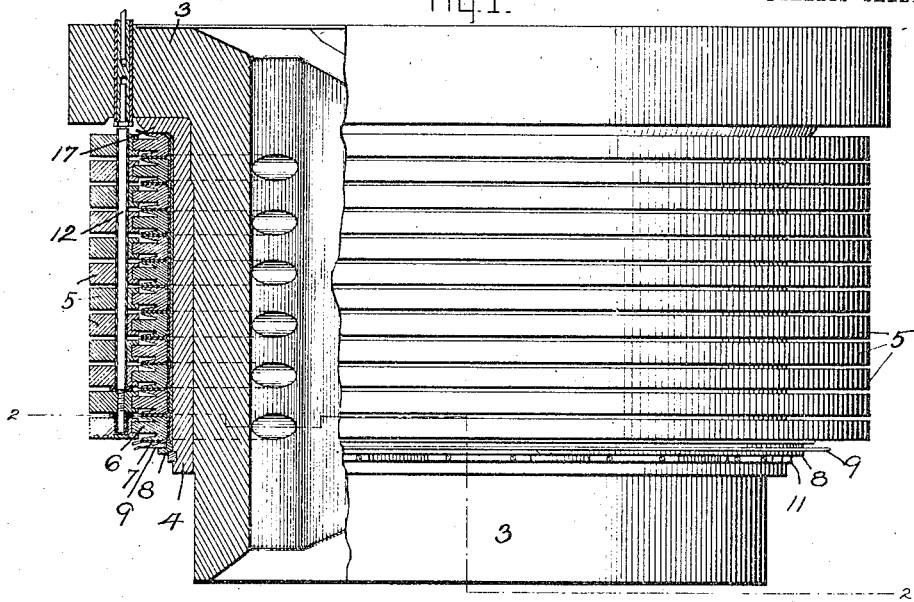
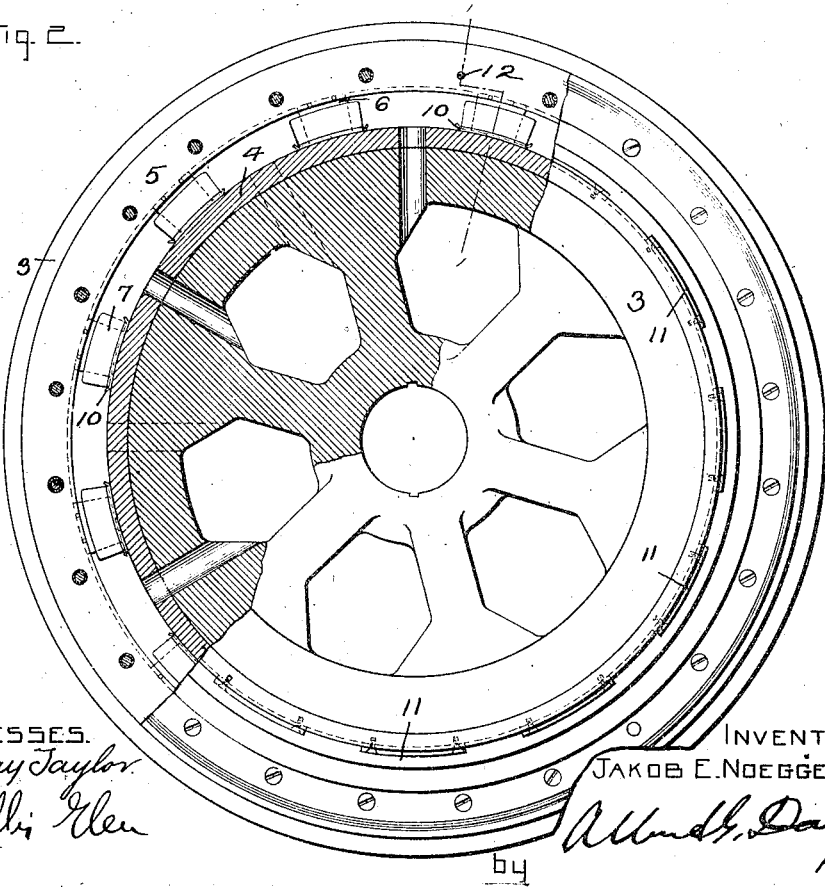
WITNESSES.
W. Ray Taylor
J. Ellis Glen
INVENTOR.
JAKOB E. NOEGGERATH.
by
ATTY

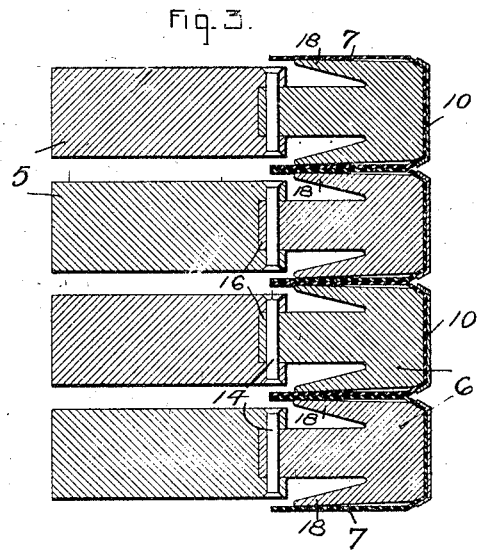
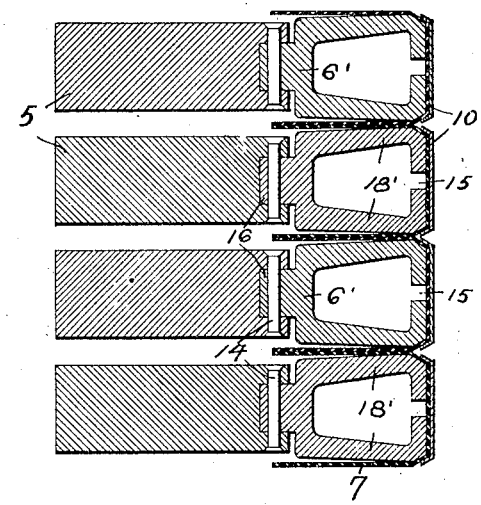
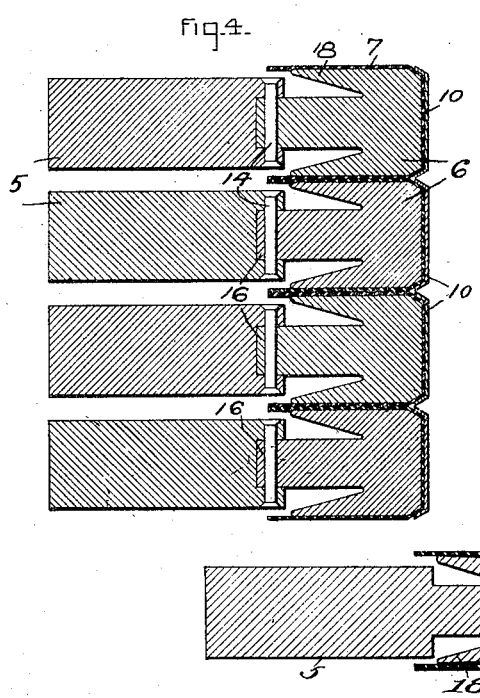
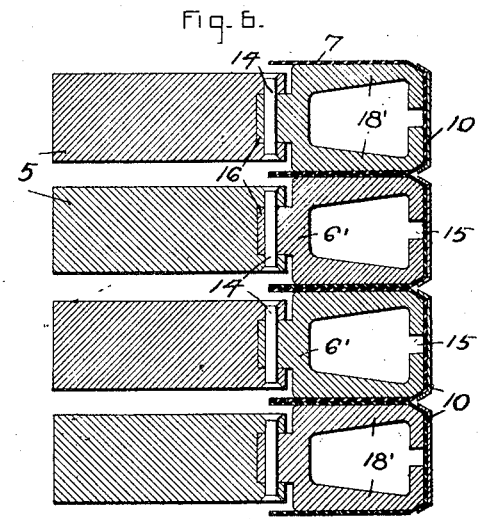
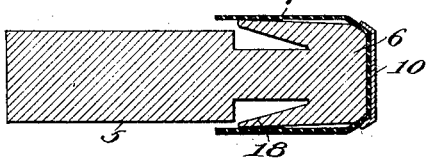

UNITED STATES PATENT OFFICE.

JAKOB E. NOEGGERATH, OF SCHENECTADY, NEW YORK, ASSIGNOR TO GENERAL ELECTRIC COMPANY, A CORPORATION OF NEW YORK.

COLLECTOR-RING.

No. 919,626.   Specification of Letters Patent.   Patented April 27, 1909.

Application filed November 26, 1907. Serial No. 403,853.

*To all whom it may concern:*

Be it known that I, JAKOB E. NOEGGERATH, a citizen of the United States, residing at Schenectady, county of Schenectady, State of New York, have invented certain new and useful Improvements in Collector-Rings, of which the following is a specification.

My invention relates to collector-rings for dynamo-electric machines and has for its object a novel construction which is particularly adapted to allow for expansion due to the heating of the rings, and to allow the assembly of the rings with key-plates.

My invention may be used to great advantage in connection with large acyclic generators, which must necessarily run at high speeds and consequently the collector-rings must always be held firmly in place, especially against lateral movement. To accomplish this end, I have so constructed and mounted the collector-rings that they are elastic, in that they may be compressed in a direction, parallel to the axis of the shell, on which they are mounted and will return to their former shape when the compression is released. When thus arranged expansion of the rings does not produce undue strains on the means for retaining them on the shell and they will return to their original shape when the temperature is reduced.

Although I have illustrated my invention as applicable to acyclic machines, I do not wish to limit myself thereto, as it may be used on any machine having collector-rings.

The various features of novelty which characterize my invention are pointed out with particularity in the claims annexed to and forming a part of this specification, but for a better understanding of my invention reference may be had to the description taken in connection with the accompanying drawing, in which—

Figure 1 shows a side view of one half of the rotary member of an acyclic generator provided with my invention, with parts broken away, and in section on line 1—1 of Fig. 2; Fig. 2 shows an end view of the rotor with parts broken away and in section on line 2—2 of Fig. 1; Fig. 3 is a detail section of my collector-rings; Fig. 4 is a view similar to Fig. 3, the parts having been expanded by heat; Figs. 5 and 6 are similar to Figs. 3 and 4, respectively, showing a modified form of my collector-ring, and Fig. 7 shows a further modification of my collector ring.

Similar reference numerals will be used throughout the specification and the several figures of the drawing to denote like parts.

3 is the armature spider on which is mounted the collector shell 4. The collector-rings consist preferably of rings 5 mounted on feet 6, which are surrounded by mica or other suitable insulation 7. The feet are equally spaced about the periphery of the shell and rest on the steel shoes 10. These steel shoes protect the mica insulation 7 from injury, especially when the collector rings are being assembled on the collector shell 4. As will be noticed in Fig. 2, these shoes are slightly turned up at the ends to keep them in place by the engagement of these up-turned portions with the collector ring feet 6.

The rings are preferably made of steel and are shrunk on the collector shell. The feet of the first ring put on abut against the flange 17 of the shell, but are insulated therefrom. The rest of the rings have their feet in close contact separated only by their insulation, and when in place on the shell are compressed in any manner whatsoever. The reason for compressing them, and one way of compressing the rings will be hereinafter explained. When compressed, one way of retaining them in place is to put the brass ring 9 and the steel ring 8 on the shell, and then the key-plates 11 in the slots turned in the shell to receive them. The compression is then partially released, the rings 8 and 9, together with the key plates 11, holding the collector rings in place and taking up part of the compression. The collector-rings are all drilled with holes, and two conductors are tapped into each ring in the construction shown. One such conductor is shown at 12. The conductors are not placed in position until the collector shell is placed on the armature spider, and consequently bolts may be placed in these holes and tightened up, thereby compressing the rings sufficiently to put the key plates 11 in position.

Referring now more particularly to Figs. 3 and 4, it will be noticed that the collector-ring feet 6 have a projection 16 which fits into a corresponding slot in the collector-rings 5, and a ring and its feet are riveted together by rivets 14. In Fig. 3 the elastic side portions 18 of the feet are shown tapered as in their normal position, and only press against each other at the ends away from the shell, while in Fig. 4 the rings are shown as having the side portions pressing together throughout their width, as when the rings are expanded by heat, or compressed in the course of assembling them on the shell.

In Figs. 5 and 6 the rings are shown as fastened to the feet 6¹ in the same way as in Figs. 3 and 4. These feet 6¹, however, are hollow, and the elastic side portions 18¹, as seen in Fig. 5, press against each other near the collector shell in their normal position. These side portions have flanges which rest in the shoes and are separated from each other by the space 15. Fig. 6 corresponds with Fig. 4 and shows the rings compressed as in assembling, or as expanded by heat. When the rings expand laterally because of the heat generated by the current carried by them and the friction and other losses of the brushes bearing on the rings, the space, due to the taper of the side portions, is filled up by the expanding metal, and the rings are thus kept tightly in place without exerting any additional strain on the key plate 11. Figs. 3 and 5 both show the taper of the side portions exaggerated for the sake of the clearness of the drawing, and it has been found expedient to use a smaller taper in commercial machines of a great number of rings.

The feet of the collector rings may be made integral therewith, and in Fig. 7 I have shown a single ring like that shown in Figs. 1 to 4, except that the feet 6 are made integral with the main portion 5 of the collector ring. Moreover, I do not desire to limit myself to any of the constructions herein described, since changes which do not depart from the spirit of my invention may be made by those skilled in the art.

What I claim as new and desire to secure by Letters Patent of the United States, is,—

1. In a dynamo-electric machine, a collector shell, collector-rings mounted on said shell but insulated therefrom, said collector-rings having portions which are elastic in the direction of the axis of the shell, and means for retaining the collector-rings on said shell comprising a member engaging said elastic portion.

2. In a dynamo-electric machine, a collector shell having a flange, collector-rings mounted on said shell but insulated therefrom, said collector-rings having portions which are elastic in the direction of the axis of the shell, and means comprising key-plates and a member engaging said elastic portion for holding said collector-rings between said flange and said member.

3. In a dynamo-electric machine, a collector shell, collector-rings mounted on said shell but insulated therefrom, said collector-rings having portions which are elastic in the direction of the axis of the shell, and means for holding said collector-rings in position on said shell including a ring engaging said elastic portion and key-plates abutting against said ring.

4. In a dynamo-electric machine, a collector shell having a flange, collector-rings mounted on said shell but insulated therefrom, said collector-rings having portions which are elastic in the direction of the axis of the shell, and means including a ring engaging said elastic portion and key-plates abutting against said ring for holding said collector-rings between said flange and said ring.

5. In a dynamo-electric machine, collector-rings having elastic supporting portions, said elastic portions of adjacent rings being in contact with each other, so that the rings may expand or be compressed and may return to their former shape.

6. In a dynamo-electric machine, a collector shell, collector-rings mounted thereon, feet for said collector-rings having elastic tapering side-portions, insulation surrounding said feet, and shoes between said feet and said shell, substantially as described.

7. In a dynamo-electric machine, a collector-ring having feet, said feet having elastic tapering side portions.

8. In a dynamo-electric machine, a collector-ring having feet substantially equidistantly spaced, said feet having elastic tapering side portions.

9. In a dynamo-electric machine, a collector-ring consisting of a ring and feet, said feet having elastic tapering side portions and projections, said ring having a slot, said projections fitting said slot, and means for fastening said ring and said feet together.

10. In a dynamo-electric machine, a collector-ring consisting of a ring and feet, said feet having elastic tapering side portions and projections, said ring having a slot, and rivets fastening said projections in said slot.

11. In a dynamo-electric machine, a collector shell, collector-rings mounted thereon and consisting of rings and feet, said feet being fastened to said rings and having elastic tapering side portions.

12. In a dynamo-electric machine, a collector shell, collector-rings mounted thereon, and consisting of rings and feet, said feet being fastened to said rings and having elastic tapering side portions, the said taper being toward the collector-ring, substantially as described.

13. In a dynamo-electric machine, a collector shell, collector-rings mounted thereon consisting of rings and feet, said feet having elastic tapering side portions and insulation surrounding the feet, the said side portions of adjacent collector-rings when cold pressing against each other only at the end away from the collector shell.

14. In a dynamo-electric machine, a ring 5 and feet 6 for said ring, said feet having projections 16 and elastic tapering side portions 18, substantially as described.

15. In a dynamo-electric machine, a collector shell, collector rings mounted on said shell, said collector rings having feet, said feet having elastic tapering side portions, insulation surrounding said feet, and means for retaining the collector rings on said shell comprising a member engaging the feet of said collector rings.

16. In a dynamo-electric machine, a collector shell having a flange, collector rings mounted on said shell, said collector rings having feet, said feet having elastic tapering side portions, insulation surrounding said feet, and means comprising a key plate and a member engaging said feet for holding said collector rings between said flange and said member.

17. In a dynamo-electric machine, a collector shell having a flange, collector rings mounted on said shell, said collector rings having feet, said feet having elastic tapering side portions, insulation surrounding said feet, shoes between said feet and said shell, and means for holding said collector rings in position on said shell comprising a key plate and a member engaging said feet.

In witness whereof, I have hereunto set my hand this 25th day of November, 1907.

JAKOB E. NOEGGERATH.

Witnesses:
  BENJAMIN B. HULL,
  HELEN ORFORD.